United States Patent
Balijapalli et al.

(10) Patent No.: US 8,817,853 B2
(45) Date of Patent: Aug. 26, 2014

(54) BROADBAND RE-CONFIGURABLE RF RECEIVER

(71) Applicants: Kameswara Rao Balijapalli, Chennai (IN); Ravi Kishore, Chennai (IN); Kumaralingam Ramamoorthy, Chennai (IN)

(72) Inventors: Kameswara Rao Balijapalli, Chennai (IN); Ravi Kishore, Chennai (IN); Kumaralingam Ramamoorthy, Chennai (IN)

(73) Assignee: HCL Technologies Limited, Chennai, Tamil Nadu (IN)

(*) Notice: Subject to any disclaimer, the term of this patent is extended or adjusted under 35 U.S.C. 154(b) by 0 days.

(21) Appl. No.: 13/723,227

(22) Filed: Dec. 21, 2012

(65) Prior Publication Data

US 2014/0177685 A1 Jun. 26, 2014

(51) Int. Cl.
*H04B 1/38* (2006.01)
*H04L 27/38* (2006.01)

(52) U.S. Cl.
CPC ................. *H04L 27/3809* (2013.01)
USPC ........................................... 375/219

(58) Field of Classification Search
CPC .... H04B 1/7085; H04B 1/38; H04B 27/0008; H04B 27/206; H04W 52/52
USPC .................................. 375/219, 316
See application file for complete search history.

(56) References Cited

U.S. PATENT DOCUMENTS

| 7,050,419 B2* | 5/2006 | Azenkot et al. ............... 370/347 |
| 2004/0037375 A1* | 2/2004 | Cowley et al. ................ 375/344 |
| 2008/0318534 A1* | 12/2008 | Mak et al. ....................... 455/91 |
| 2013/0322498 A1* | 12/2013 | Maquire ........................ 375/219 |

* cited by examiner

*Primary Examiner* — Don N Vo

(57) ABSTRACT

An RF receiver system operating on a broader frequency range and wide input dynamic power range is described. Received RF signal is downconverted to baseband signal using multiple quadrature demodulators. A microcontroller system controls the RF receiver by selecting frequency range to be produced by the frequency synthesizer, selecting appropriate amplification path for producing the required output power, controlling the power module for checking for automatic power gain and automatic gain control.

50 Claims, 9 Drawing Sheets

BROADBAND RE-CONFIGURABLE RF RECEIVER

The present application is based on, and claims priority from, IN Application Number 2433/CHE/2012, filed on 19 Jun. 2012, the disclosure of which is hereby incorporated by reference herein.

TECHNICAL FIELD

This embodiment relates to radio frequency receiver and more particularly to a RF receiver with re-configurable frequency and re-configurable input power dynamic range.

BACKGROUND

Advances in wireless technology along with development of analog/digital electronics has lead to wide range of wireless/radio access technologies. Each radio access technology has a specific purpose, works on a particular frequency/frequency band and able to operate over input power dynamic range. Receivers of user equipment devices are generally made specific for each wireless technology. It is essential that user equipments support all radio access technologies based on need and availability. In some user equipments, multiple receivers are used for accessing multiple radio access technologies. This leads to heavier/ and more complex user equipment along with various interference issues.

Wireless communication systems like cognitive radio are working towards allowing the wide frequency spectrum to be shared thus enabling efficient radio spectrum utilization where in base station/access point and user equipments needs to be broadband and re-configurable in terms of frequency range of operation and input power.

For cognitive radios to succeed, it is essential that the receivers are capable of operating in a broader frequency range and over adequate input dynamic power range.

SUMMARY

Accordingly, the embodiment provides a re-configurable broadband radio frequency receiver system operating on a broad frequency range and a wide input power range comprising multiple quadrature demodulators for downconverting received RF signal to baseband signal; a broadband local oscillator with multiple frequency selection paths for generating and re-configuring operating frequency; a fixed frequency local oscillator for generating an fixed local oscillator signal; an amplification path selection and digital variable attenuator-DVA settings for re-configuring to desired input power; multiple power detection sections for precise detection and configuring of desired input power; a RF power detection section for automatic gain control; a reference frequency section for providing the reference frequency to frequency synthesizer; and a microcontroller for receiving and sending signals for re-configuring the RF receiver.

Also, disclosed herein is a method for operating on a broad frequency range and providing a wide output power range in an RF receiver, the method comprising of downconverting received RF signal to baseband signal using multiple quadrature demodulators; generating and re-configuring operating frequency using broadband local oscillator with multiple frequency paths; generating a fixed frequency signal using a fixed frequency local oscillator; selecting amplification path and digital variable attenuators—DVA setting for re-configuring RF receiver to desired input power; detecting power for automatic power control and automatic power control and automatic gain control using a RF power detection module; providing reference frequency to a frequency synthesizer using a reference frequency section; and receiving and sending signals for re-configuring and controlling the RF receiver from a microcontroller.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

Figure 1:
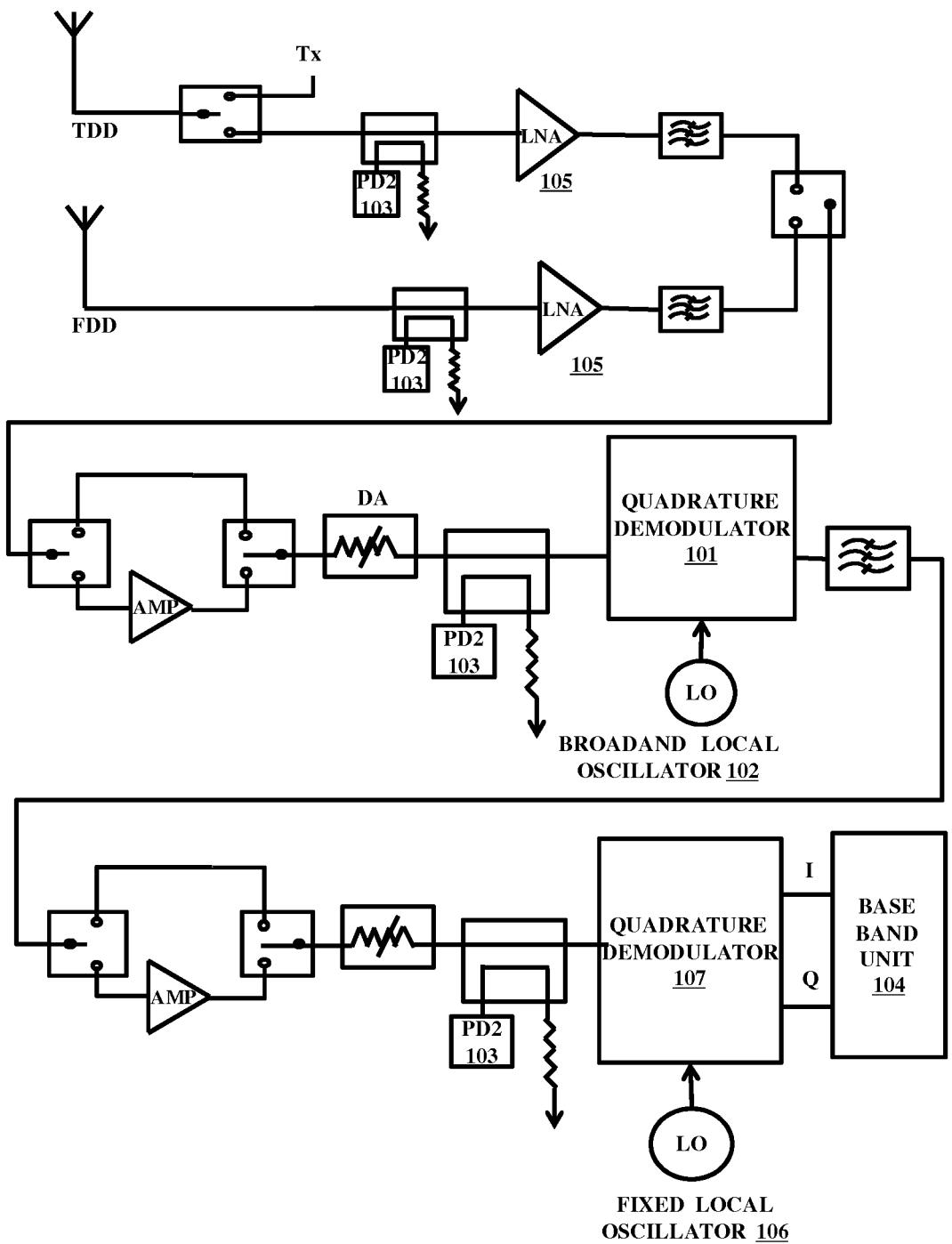
FIG. 1 illustrates a low level block diagram of broadband re-configurable RF receiver, according to the embodiments as disclosed herein.

The embodiments herein, the various features, and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 9, where similar reference characters denote corresponding features consistently throughout the figures, there are shown preferred embodiments.

FIG. 1 illustrates a low-level block diagram of broadband re-configurable RF receiver, according to the embodiments as disclosed herein. The broadband, re-configurable RF receiver comprises of two quadrature demodulators, broadband local oscillator circuitry, RF low noise amplifiers, RF variable attenuators, RF Power detection circuitry, reference generation circuitry and control and monitoring circuitry. The received signal from antenna is fed to the broadband re-configurable RF receiver In the presence of transmitter; receiver can also work at the TDD (Time Division Duplex) mode or FDD (Frequency Division Duplex) mode using the switch as shown in FIG. 1. The broadband re-configurable RF receiver provides the appropriate amplification to the input signal using the low noise amplifier 105, gain blocks and digital attenuators. Amplified input signal is down converted into baseband signal 104 using dual conversion. At first conversion, the quadrature demodulator 101 converts the Input RF frequency signal into First IF (say 70 MHz signal)). At second conversion, the first IF is further downconverted into zero IF or low IF signal (say 0 MHz to 22 MHz) using another quadrature demodulator 107. Local oscillator signal for the first quadrature demodulator 101 (First LO) is generated using broadband LO circuitry 102. Local oscillator signal for the second quadrature modulator 107 (Second LO) is constant/fixed frequency 106 and generated by fixed frequency LO circuitry. Multiple power detection circuitry are used for precise power detection and thus for precise automatic gain control (AGC). The power detection circuitry 103 comprising an ultra high bandwidth, high directivity coupler and power detector. The reference signal required for generating the Local oscillator signals is provided using reference generating circuitry. The controlling and re-configuring are done by the control and monitoring circuitry. The re-configurability in terms of operating frequency is provided by changing the Local oscillator signal (from the broadband local oscillator circuitry, First LO 102) to the quadrature demodulator 101. The frequency is re-configurable or changeable in precise steps (say in the order of 100 KHz). The re-configurability in terms of input power dynamic range is provided by selecting the appropriate amplification path (out of the four (N) paths) using automatic gain control (AGC) mechanism The receiver is re-configurable/changeable to the input power level in precise steps (say in the order of 1 dB). The receiver can operate over a broad frequency range (say from 400 MHz to 6000 MHz) and can support broad input power dynamic range (say average input power from −80 dBm to +00 dBm). The receiver is reconfigurable to any frequency within the frequency range of operation and can be configured to any input power within the input power dynamic range.

Figure 2:
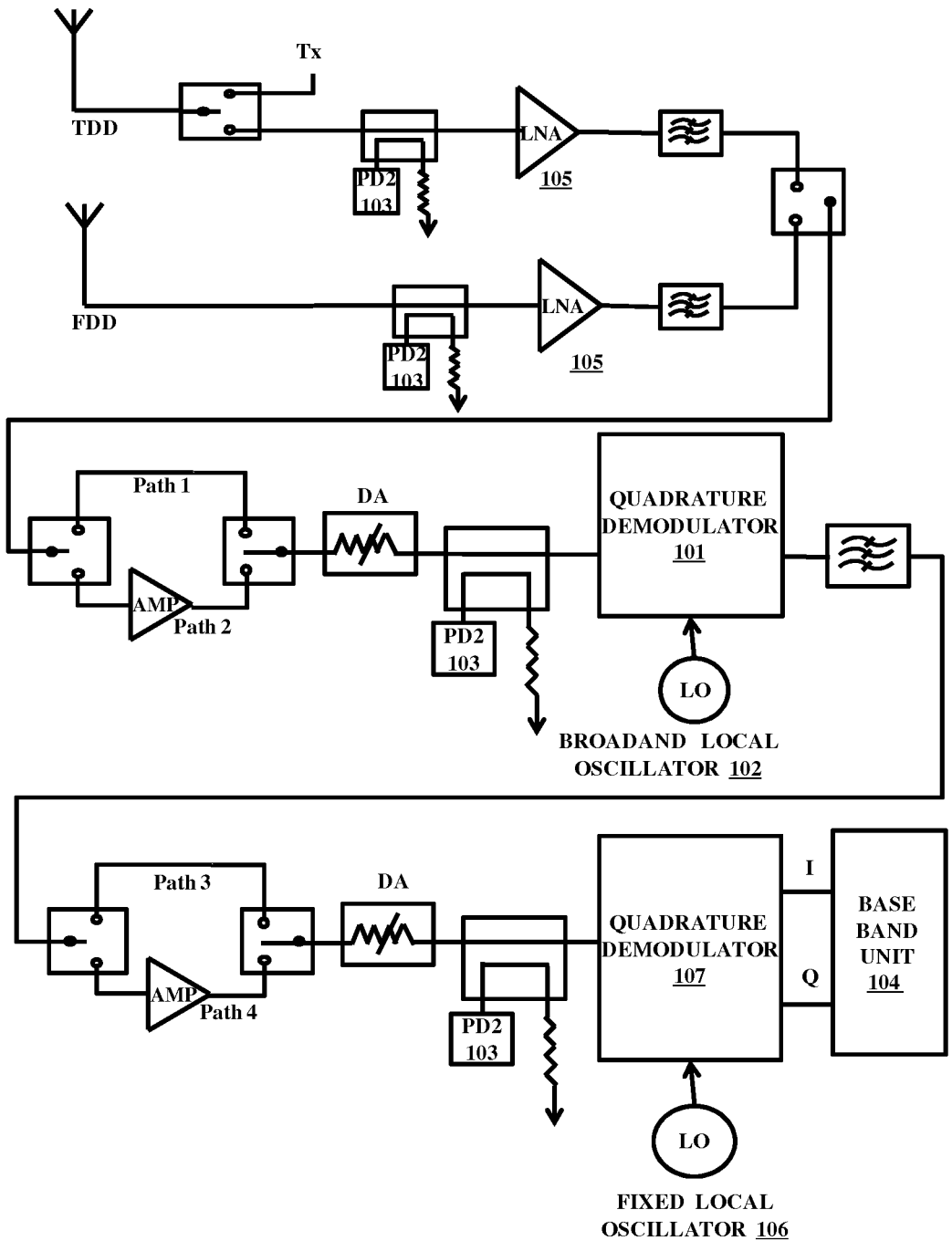
FIG. 2 is a block diagram showing path switching to achieve broad input power dynamic range in the re-configurable RF receiver, according to embodiments disclosed herein.

FIG. 2 is a block diagram showing path switching to achieve broad input power dynamic range in the broadband re-configurable RF receiver, according to embodiments disclosed herein. The broadband re-configurable RF receiver is capable of operating at broad dynamic input power range (say in the range, −80 dBm to +0 dBm in 1 dB steps). In order to provide the broad input power dynamic range over broad frequency range, appropriate amplification path is selected. The re-configurability for broad input power dynamic range is provided by providing multiple amplification paths (out of the four (N) paths) to the RF input signal, using automatic gain control (AGC) mechanism. At very low input power level for the all frequency range path 2 and path 4 is selected by the microcontroller. As input power level is increased accordingly path is changed by the microcontroller. The path selection will be done by the control and monitoring circuitry.

Figure 3:
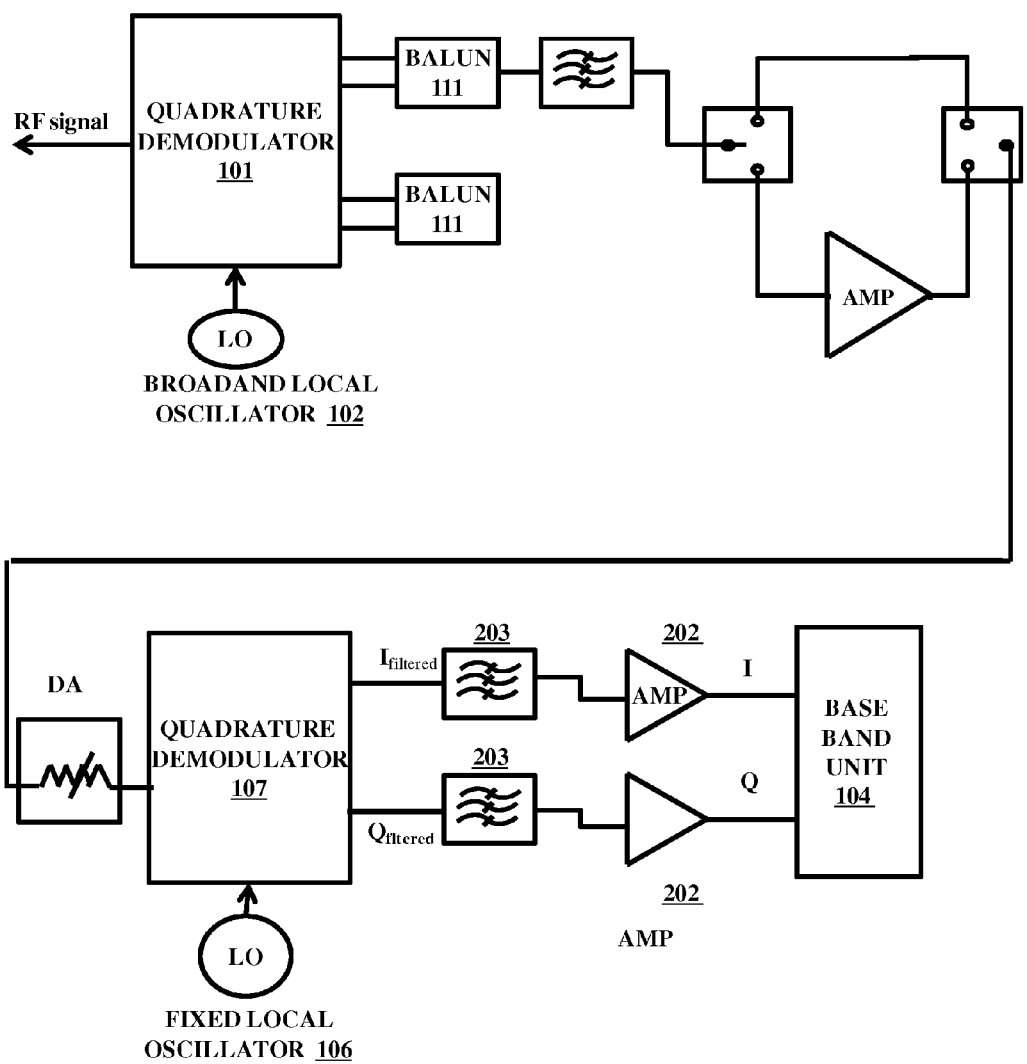
FIG. 3 is an block diagram describing the In-Outs of the quadrature demodulators, according to embodiments disclosed herein.

FIG. 3 is a block diagram of in-outs of the quadrature demodulators, according to embodiments disclosed herein. The implementation is based on dual conversion architecture to avoid the de-sensitization of the receiver. To avoid de-sensitization (degradation in sensitivity of the weak desired signal in the presence of strong undesired signals), suitable filters are employed. The desired frequency is converted into one/first intermediate frequency (say 70 MHz) and then a fixed frequency bandpass filter is used at an intermediate frequency (say 70 MHz) to pass desired frequency and reject unwanted frequencies. Thus, the appropriately amplified RF signal (say in the range 400 MHz to 6000 MHz) is fed to first quadrature demodulator 101, where it gets converted to first IF (say 70 MHz). The first IF frequency is suitably amplified or attenuated, using the amplifier, digital variable attenuator and bypassing the amplifier. The amplified signal is then fed to the second quadrature demodulator 107, which is down-converted into the second IF or wide bandwidth baseband signal (say ranging from 0 to 22 MHz). Baseband signal is then filtered and amplified and fed to the baseband unit (BBU) 104. The local oscillator signal required for the quadrature demodulators are provided by the broadband LO circuitry 102 and fixed frequency oscillator circuitry 106. The reference signal required for generating the broadband local oscillator signal 102 and fixed frequency local oscillator 103, is provided using reference generating circuitry. The controlling and re-configuring are done by the control and monitoring circuitry.

Figure 4:
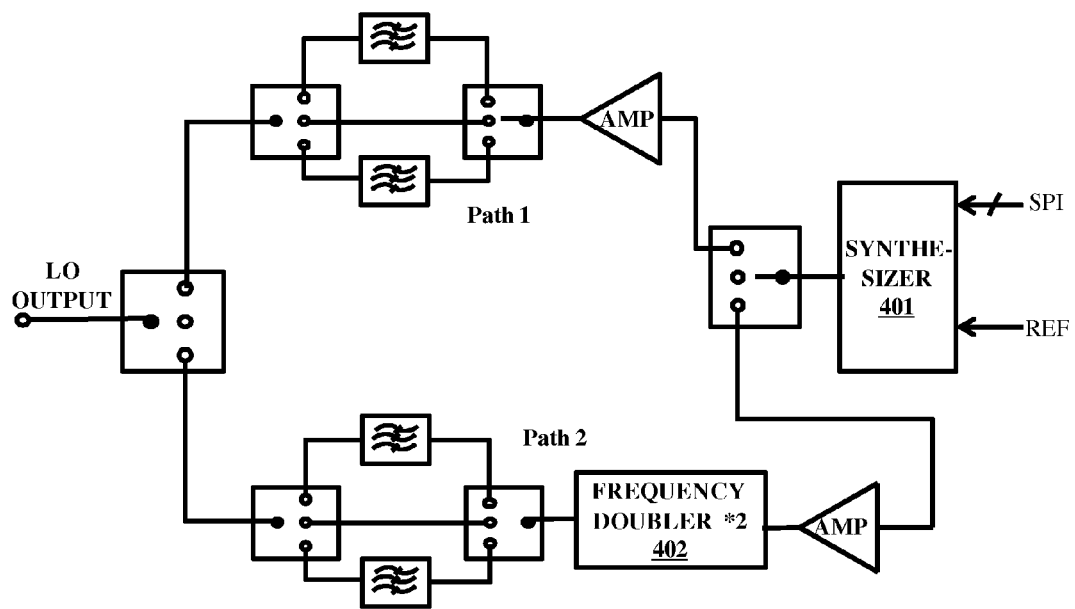
FIG. 4 is a block diagram of broadband local oscillator section, according to embodiments disclosed herein.

FIG. 4 is a block diagram of broadband local oscillator section, according to embodiments disclosed herein. A frequency synthesizer 401 is used to produce the desired range of frequencies. The frequency synthesizer uses the reference frequency generated by the reference generating section. Synthesizer 401 receives commands from the control and monitoring circuitry and accordingly generates a broadband local oscillator frequency. To achieve broadband operation, the LO section comprises two paths. The path 1 is to generate the portion of the entire frequency range that the frequency synthesizer 401 could support. The path 2 comprises a frequency multiplier to cover the remaining portion of the frequency range and that the frequency synthesizer 401 could not support. Appropriate amplification and filtering is provided in both paths to achieve required LO power level and harmonic rejection. Appropriate path will be selected using RF switches, which receives the commands from control and monitoring circuitry.

Fixed frequency local oscillator signal 106 is generated by the second synthesizer, which is directly connected to the second quadrature demodulator 107, to convert the first IF frequency into the second IF or wide bandwidth baseband signals (say ranging from 0 Hz to 22 MHz).

Figure 5:
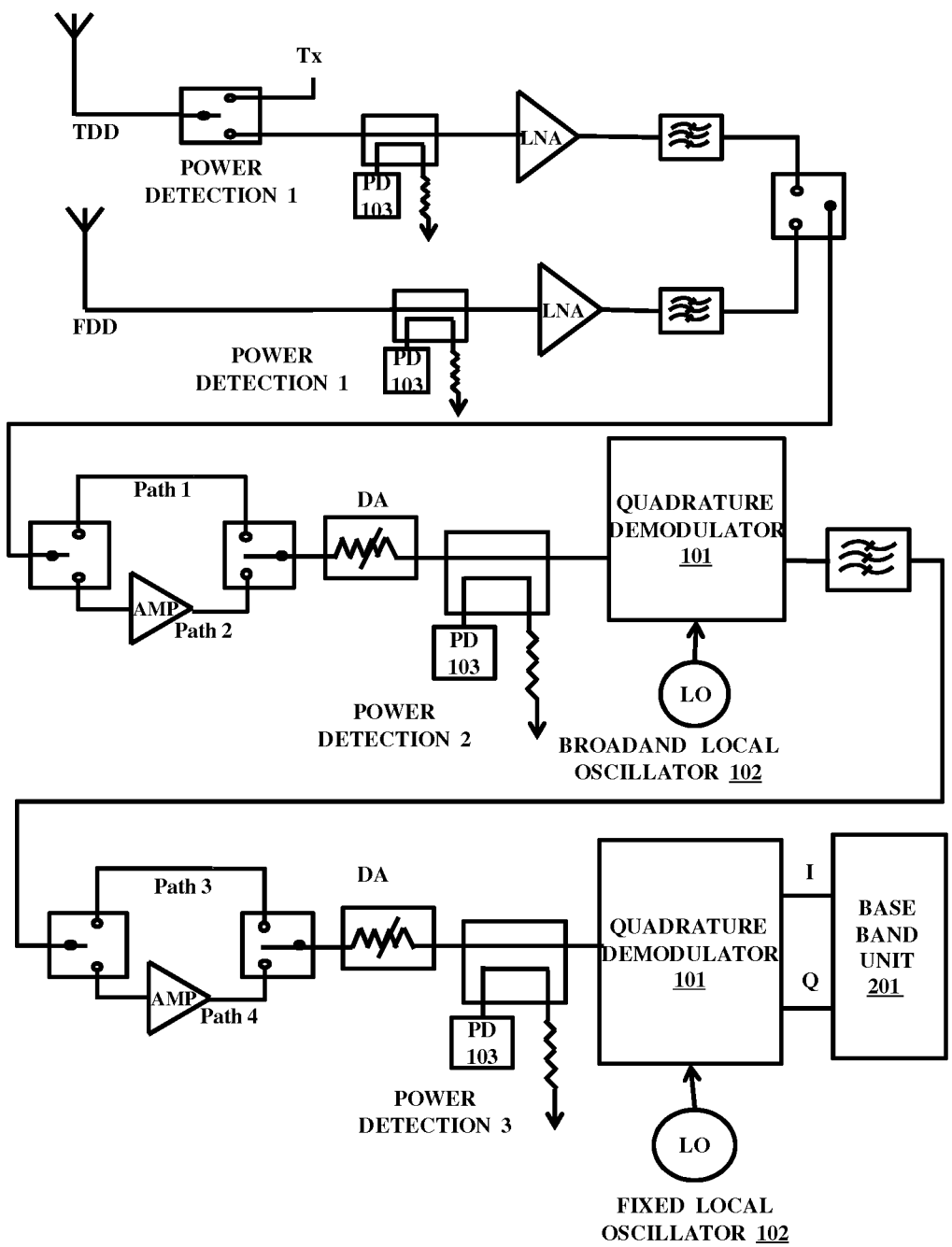
FIG. 5 is a block diagram showing multiple power detectors used in the re-configurable RF receiver, according to embodiments disclosed herein.

FIG. 5 is a block diagram of showing multiple power detector used in the re-configurable RF receiver, according to embodiments disclosed herein. In order to provide accurate and precise automatic gain control, the power detection is done at multiple stages in the signal chain using multiple power detectors. Power detectors are placed in RF section (before first conversion) as well as in the IF section (after first conversion). Depending on the TDD/FDD mode, corresponding power detector 1 is selected.

Figure 6:
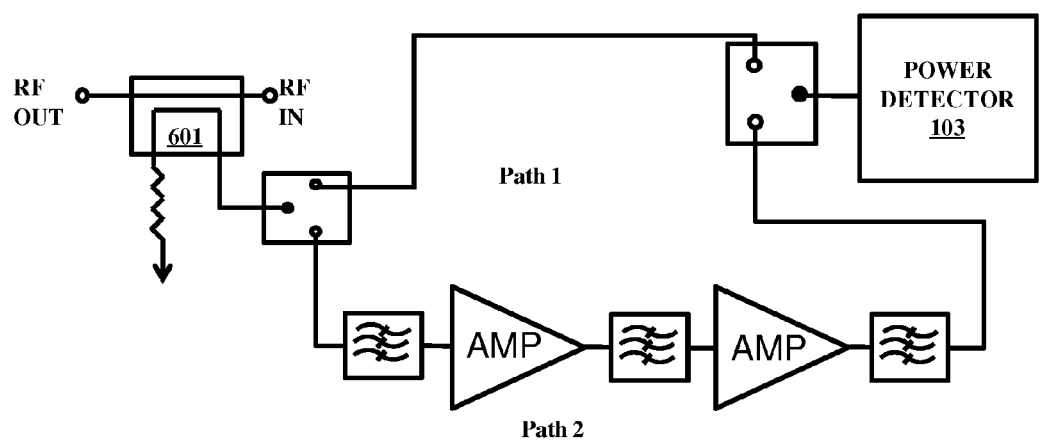
FIG. 6 is a block diagram of power detection section used in the re-configurable RF receiver, according to embodiments disclosed herein.

FIG. 6 is a block diagram of power detector module used in the re-configurable RF receiver, according to embodiments disclosed herein. For detecting the RF power over a broad range of frequencies, a broadband directional coupler 601 is used. The detailed description of the broadband directional coupler is described in 2241/CHE/2012, the description of which is included herein by reference. In order to provide the power detection for a broad power range, suitable amplification is provided to the coupled signal. The coupled signal is provided to the power detector 103 to report the signal level to the controller for AGC functionality. The coupled signal of the first IF signal is generated by the narrow frequency band directional coupler and appropriately amplified is sent to the power detector 103 for AGC functionality.

Figure 7:
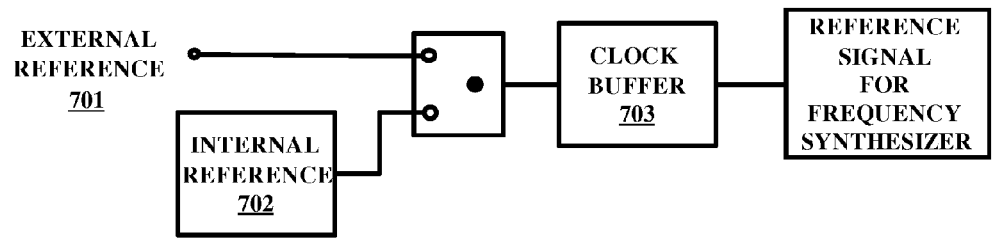
FIG. 7 is a block diagram of reference generating section used in the re-configurable RF receiver, according to embodiments disclosed herein.
Figure 8:
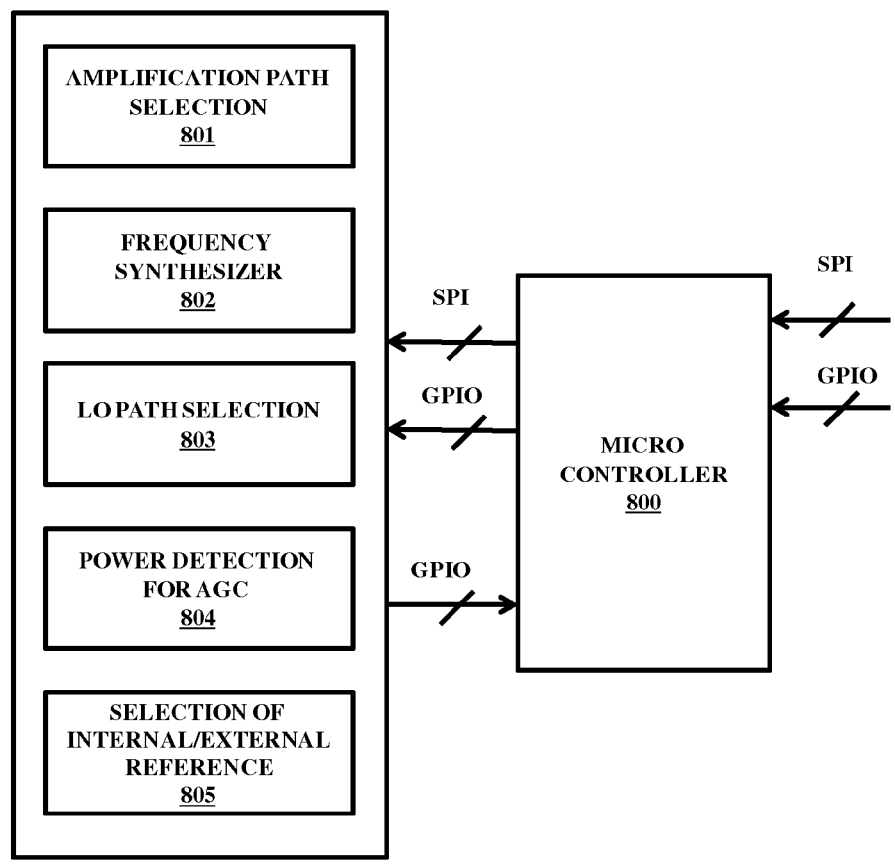
FIG. 8 is a block diagram of control and monitoring section used in the re-configurable RF receiver, according to embodiments disclosed herein.

FIG. 7 is a block diagram of reference generating module used in the re-configurable RF receiver, according to embodiments disclosed herein. The reference section produces the required reference signal for the frequency synthesizers to produce the local oscillator signal. By default, the system operates with internal reference frequency 702 which is generated by the TCXO/OCXO (say 10 MHz). In the presence of the external reference frequency 701 (say at 10 MHz) with required frequency and with adequate power level, internal reference will be automatically switched off and external reference is given to the Frequency synthesizers. The internal reference or external reference is fed to the clock buffer 703 through the switch, which generates multiple reference signals and sends to the frequency synthesizers FIG. 8 is a block diagram of control and monitoring section used in the re-configurable RF receiver, according to embodiments disclosed herein. The control and monitoring interface section contains a microcontroller 800 and its associated circuitry. This section receives the instruction from the baseband unit 104 through an interface (say SPI) for a required frequency (within the frequency range of operation) and/or expected input power (within the input power dynamic range). The microcontroller 800 configures the Frequency synthesizers 401 of the LO circuitry for the corresponding frequency and will select the appropriate amplification path and provide variable digital attenuators setting 801 for the corresponding input power. The microcontroller 800 will also select the appropriate path 803 (Direct/frequency multiplier path) for the LO. Using the software implementation in microcontroller 800 and with the help of the power detection circuitry 804, AGC functionalities are executed. This microcontroller 800 is responsible for selection of the internal or external reference for the frequency synthesizers The receiver is re-configurable in terms of frequency change and input power change as per the commands it receive from the baseband unit 104.

Figure 9:
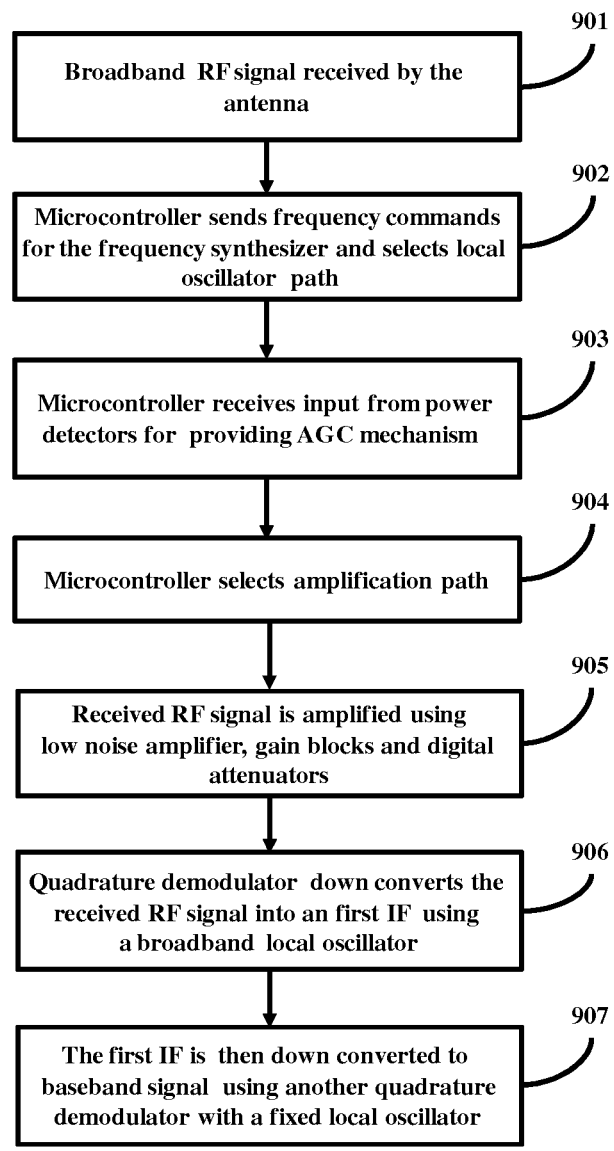
FIG. 9 is a flowchart describing the method of operation of the broadband re-configurable RF receiver, according to the embodiments as disclosed herein.

FIG. 9 is a flowchart describing the method of operation of the broadband re-configurable RF receiver, according to the embodiments as disclosed herein. The antenna of the broadband re-configurable receiver receives 901 the RF signal. Microcontroller 800 sends frequency command to the frequency synthesizers 401 and selects 902 corresponding local oscillator path. The local oscillator path is selected based on the frequency range required. Microcontroller 800 receives 903 inputs from power detectors 103 at various points in the signal chain for providing the AGC. The microcontroller 800 selects 904 amplification path in the receiver based on requirement of automatic gain control. Received RF signal is appropriately amplified using 905 low noise amplifiers 105, gain blocks and variable digital attenuators. The first quadrature demodulator 101 downconverts 906 the received RF signal into a first IF using a broadband local oscillator 102. The first IF is then downconverted to baseband signal using 907 another quadrature demodulator 107 with a fixed frequency local oscillator 106. At first conversion, the quadrature demodulator converts the input RF frequency signal into first IF (say 70 MHz). At second conversion, the first IF is further downconverted into zero IF or low IF signal (0 MHz to 22 MHz) using another quadrature demodulator. Local oscillator signal for the first quadrature demodulator (First LO) is generated using broadband LO circuitry 102. Local oscillator signal for the second quadrature demodulator (Second LO) is constant/fixed frequency 106 and generated by fixed frequency LO circuitry.

The broadband reconfigurable RF receiver is well suited in broadband wireless communication systems that requires a broad frequency range of operation (say 400 MHz to 6000 MHz) and requires to operate over broad input power dynamic range (say −80 dBm to +0 dBm average input power). The broadband re-configurable RF receiver is well suited in multi band wireless communication systems that operate on multiple bands/multiple standards (GSM, CDMA, UMTS, Wi-Fi, GPS, etc). The receiver is able to operate on broader range of frequency (400 MHz to 6000 MHz) and able to re-configure to any frequency within the operating frequency range. The embodiment is able to operate over broad input power dynamic range (average input power of −80 dBm to −0 dBm) and able to re-configure to the required input power within the dynamic range. Considering the broadband and re-configurability, the broadband RF receiver is well suited for flexible RF front end for Software Defined radios (SDRs) and Cognitive Radios (CRs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A re-configurable broadband radio frequency receiver system operating on a broad frequency range and a wide input power range comprising:

a broadband local oscillator with multiple frequency selection paths for generating and re-configuring at least a radio frequency signal, wherein said broadband local oscillator is configured to downconvert said radio frequency signal using at least a first quadrature demodulator to produce at least an intermediate frequency;

a fixed frequency local oscillator for generating a fixed local oscillator signal, wherein said fixed frequency local oscillator is configured to downconvert said intermediate frequency using at least a second quadrature demodulator to generate at least a baseband signal;

at least a microcontroller configured to provide at least an amplification path selection and digital variable attenuator settings for reconfiguring said radio frequency receiver system to desired input power;

multiple power detection sections for precise detection and configuration of said desired input power of said radio frequency receiver system;

a radio frequency power detection section for automatic gain control of said radio frequency receiver system; and a reference frequency section for providing at least a reference frequency to at least a frequency synthesizer, said frequency synthesizer, configured to generate at least a local oscillator frequency.

2. The broadband re-configurable radio frequency receiver system according to claim 1, wherein received radio frequency signal from antenna is converted in to the baseband signal using double/dual conversion to avoid receiver desensitization.

3. The broadband re-configurable radio frequency receiver system according to claim 1, wherein said multiple quadrature demodulators further comprises of:
one quadrature demodulator for downconverting received radio frequency signal to first intermediate frequency signal; and
another quadrature demodulator for downconverting the first intermediate frequency to baseband signal.

4. The broadband re-configurable radio frequency receiver system according to claim 1, wherein said multiple frequency selection paths of said broadband local oscillator further comprises:
one path to generate the portion of the entire frequency range that the frequency synthesizer could support; and
one path comprising of a frequency multiplier to cover the remaining portion of the frequency range and that the frequency synthesizer could not support.

5. The broadband re-configurable radio frequency receiver system according to claim 1, wherein said system further comprises:
a plurality of the radio frequency amplifiers, responsive to provide the amplification to the generated broadband local oscillator frequency from the frequency synthesizer;
a plurality of radio frequency switches, responsive to provide an amplification path according to generated broadband local oscillator frequency; and
a plurality of low pass filter, for harmonics rejection.

6. The broadband re-configurable radio frequency receiver system according to claim 1, wherein said broadband local oscillator changes frequency in precise steps.

7. The broadband re-configurable radio frequency receiver system according to claim 1, wherein said broadband oscillator is reconfigurable in order of 100 KHz.

8. The broadband re-configurable radio frequency receiver system according to claim 1, wherein frequency synthesizer re-configures at any frequency within the frequency range of the synthesizer using the microcontroller.

9. The broadband re-configurable radio frequency receiver system according to claim 1, wherein said frequency selection path is selected based on the operating frequency selected by said microcontroller.

10. The broadband re-configurable radio frequency receiver system according to claim 1, wherein said fixed frequency local oscillator comprises of a fixed frequency synthesizer.

11. The broadband re-configurable radio frequency receiver system a cording to claim 1, wherein frequency synthesizer is re-configurable to any frequency within the frequency range of the synthesizer using the microcontroller as per the desired baseband frequency bandwidth.

12. The broadband re-configurable radio frequency receiver system according to claim 1, wherein said fixed frequency local oscillator comprises a fixed frequency synthesizer.

13. The broadband re-configurable radio frequency receiver system according to claim 1, wherein receiver can be re-configurable to the desired input power in precise steps.

14. The broadband re-configurable radio frequency receiver system according to claim 1, wherein the receiver is re-configurable to the input power level in steps of 1 dB.

15. The broadband re-configurable radio frequency receiver system according to claim 1, wherein the selection of appropriate amplification path, using the radio frequency switches and corresponding digital variable attenuator settings in the corresponding path by the microcontroller, is done according to the desired input power level.

16. The broadband re-configurable radio frequency receiver system according to claim 1, wherein said multiple power detection sections are used to precisely detect input power level.

17. The broadband re-configurable radio frequency receiver system according to claim 1, wherein said multiple power detection sections provide automatic gain control at required input power level.

18. The broadband re-configurable radio frequency receiver system according to claim 1, wherein said power detection module comprises of ultra high bandwidth, high directivity coupler and power detector.

19. The broadband re-configurable radio frequency receiver system according to claim 1, wherein said power detection section comprises of amplifiers and filters for providing the suitable amplification to the coupled radio frequency signal.

20. The broadband re-configurable radio frequency receiver system according to claim 1, wherein said reference frequency section provides reference signal to the frequency synthesizers.

21. The broadband re-configurable radio frequency receiver system according to claim 20, where in under the presence of external reference frequency with adequate power level and required frequency, the internal frequency will automatically get powered-off.

22. The broadband re-configurable radio frequency receiver system according to claim 1, wherein the reference section further comprises:
an internal frequency generator; and
an option to select the external reference signal using the radio frequency switch.

23. The broadband re-configurable radio frequency receiver system according to claim 1, wherein said microcontroller receives a command signal from a baseband unit and sends the control signals (internal) for the proper functioning of the receiver.

24. The broadband re-configurable radio frequency receiver system according to claim 1, wherein said microcontroller sends the health status of the receiver to the baseband unit.

25. The broadband re-configurable radio frequency receiver system according to claim 1, wherein the TX/RX radio frequency switch provides a provision if the receiver needs to operate in TDD mode of operation or in the FDD mode of operation, in presence of the transmitter.

26. The broadband re-configurable radio frequency receiver system according to claim 1, wherein said receiver is changeable to a desired input power in precise steps.

27. A method for operating on a broad frequency range and providing a wide input power range in an RF receiver, said method comprising:
generating and re-configuring at least a radio frequency signal, using at least a broadband local oscillator with multiple frequency paths, wherein said broadband local oscillator is configured to downconvert said radio frequency signal using at least a first quadrature demodulator, wherein said downconversion is configured to generate at least an intermediate frequency;
generating a fixed frequency signal using a fixed frequency local oscillator, wherein said fixed frequency local oscillator is configured to downconvert said intermediate frequency using at least a second quadrature demodulator to generate at least a baseband signal;

providing at least selection of amplification path and digital variable attenuators settings for reconfiguring said radio frequency receiver system to a desired input power, by at least a microcontroller;

detecting power for automatic power control, by multiple power detection sections and automatic gain control using a radio frequency power detection module for said radio frequency receiver system;

providing reference frequency to said frequency synthesizer using a reference frequency section; and generating at least a local oscillator frequency, using said frequency synthesizer.

28. The method as in claim 27, wherein received radio frequency signal from antenna is converted in to the baseband signal using double/dual conversion to avoid receiver desensitization.

29. The method as in claim 27, wherein said multiple quadrature demodulators further comprises:
one quadrature demodulator for downconverting received radio frequency signal to first intermediate frequency signal; and
another quadrature demodulator for downconverting the first intermediate frequency to baseband signal.

30. The method as in claim 27, wherein said multiple frequency selection paths of said broadband local oscillator further comprises:
one path to generate the portion of the entire frequency range that the frequency synthesizer could support; and
one path comprising of a frequency multiplier to cover the remaining portion of the frequency range and that the frequency synthesizer could not support.

31. The broadband re-configurable broadband radio frequency receiver system according to claim 27, wherein said system further comprises:
a plurality of the radio frequency amplifiers, responsive to provide the amplification to the generated local oscillator frequency from the frequency synthesizer;
a plurality of radio frequency switches, responsive to provide an amplification path according to generated broadband local oscillator frequency; and
a plurality of low pass filter, for harmonics rejection.

32. The method as in claim 27, wherein said broadband local oscillator changes frequency in precise steps.

33. The method as in claim 27, wherein said broadband local oscillator is reconfigurable in order of 100 KHz.

34. The method as in claim 27, wherein said frequency synthesizer re-configures at any frequency within the frequency range of the synthesizer using the microcontroller.

35. The method as in claim 27, wherein said frequency selection path is selected based on the operating frequency selected by said microcontroller.

36. The method as in claim 27, wherein said fixed frequency local oscillator comprises of a fixed frequency synthesizer.

37. The method as in claim 27, wherein receiver can be re-configurable to the desired input power in precise steps.

38. The method as in claim 27, wherein said receiver is changeable to a desired input power in precise steps.

39. The method as in claim 27, wherein said receiver is re-configurable to said input power level in steps of 1 dB.

40. The method as in claim 27, wherein the selection of appropriate amplification path, using the radio frequency switches and corresponding digital variable attenuator settings in the corresponding path by the microcontroller, is done according to the desired input power level.

41. The method as in claim 27, wherein said multiple power detection sections are used to detect precise input power level.

42. The method as in claim 27, wherein said multiple power detections sections provide automatic gain control precisely at required input power level.

43. The method as in claim 27, wherein said power detection module comprises of ultra high bandwidth, high directivity coupler and power detector.

44. The method as in claim 27, wherein said power detection section comprises of amplifiers and filters for providing the suitable amplification to the coupled radio frequency signal.

45. The method as in claim 27, wherein said reference frequency section provides reference signal to the frequency synthesizers.

46. The method as in claim 27, wherein the reference section further comprises:
an internal frequency generator; and
an option to select the external reference signal using the radio frequency switch.

47. The method as in claim 27, where in under the presence of external reference frequency with adequate power level and required frequency, the internal frequency will automatically get powered-off.

48. The method as in claim 27, wherein said microcontroller receives a command signals from a baseband unit and sends the control signals (internal) for the proper functioning of the receiver.

49. The method as in claim 27, wherein said microcontroller sends the health status of the receiver to the baseband unit.

50. The method as in claim 27, wherein the TX/RX radio frequency switch provides a provision if the receiver needs to operate in TDD mode of operation or in the FDD mode of operation, in presence of the transmitter.

* * * * *